(12) United States Patent
Dunlap, III et al.

(10) Patent No.: US 12,179,877 B2
(45) Date of Patent: Dec. 31, 2024

(54) BICYCLE SUSPENSION SYSTEM WITH AUTOMATIC VENTING

(71) Applicant: SRAM, LLC, Chicago, IL (US)

(72) Inventors: Charles Dunlap, III, Manitou Springs, CO (US); Brent Packer, Manitou Springs, CO (US); Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 443 days.

(21) Appl. No.: 17/355,635

(22) Filed: Jun. 23, 2021

(65) Prior Publication Data

US 2022/0411007 A1  Dec. 29, 2022

(51) Int. Cl.
 *B62K 25/08* (2006.01)
 *B62K 21/08* (2006.01)
 *B62K 25/04* (2006.01)
 *B62K 25/10* (2006.01)

(52) U.S. Cl.
 CPC .............. *B62K 25/08* (2013.01); *B62K 21/08* (2013.01); *B62K 25/04* (2013.01); *B62K 25/10* (2013.01)

(58) Field of Classification Search
 CPC ........ B62K 25/08; B62K 21/08; B62K 25/04; B62K 25/10
 See application file for complete search history.

(56) References Cited

U.S. PATENT DOCUMENTS

| | | |
|---|---|---|
| 2,683,044 A | 7/1954 | Seddon |
| 2,708,112 A | 5/1955 | Seddon |
| 4,145,067 A | 3/1979 | Ceriani |
| 5,044,648 A | 9/1991 | Knapp |
| 6,371,263 B1 | 4/2002 | Hoose |
| 7,231,939 B1 | 6/2007 | Bruckbauer |
| 7,699,146 B1 | 4/2010 | Becker et al. |
| 9,103,400 B2 | 8/2015 | Becker |
| 9,739,331 B2 | 8/2017 | Becker |
| 10,228,039 B2 | 3/2019 | Becker |
| 10,746,250 B2 | 8/2020 | Becker |
| 11,472,252 B2 * | 10/2022 | Tong ................. F16F 9/325 |
| 11,499,601 B2 * | 11/2022 | Marking ............ F16F 9/065 |
| 11,519,477 B2 * | 12/2022 | Marking ............ F16F 9/346 |
| 11,708,878 B2 * | 7/2023 | Marking ............ F16F 9/468 188/266.2 |
| 2008/0115838 A1 | 5/2008 | Huang |

(Continued)

FOREIGN PATENT DOCUMENTS

| | | |
|---|---|---|
| CN | 101638126 | 4/2012 |
| CN | 111878539 | 11/2020 |

(Continued)

OTHER PUBLICATIONS

"Manitou micro lube?", Website: https://www.bikeforums.net/bicycle-mechanics/9379-manitou-micro-lube.html, May 25, 2002, last checked Oct. 20, 2023.

(Continued)

*Primary Examiner* — Kevin Hurley
*Assistant Examiner* — Marlon A Arce

(57) ABSTRACT

A bicycle suspension system with automatic venting and/or pressurizing of a sealed chamber that minimizes the pressure differential between the sealed chamber and the ambient environment. Methods for making and using the bicycle suspension system are also provided.

24 Claims, 16 Drawing Sheets

(56) References Cited

U.S. PATENT DOCUMENTS

| | | | |
|---|---|---|---|
| 2011/0163507 A1 | 7/2011 | Downes | |
| 2013/0319805 A1* | 12/2013 | Becker | F16F 9/435 |
| | | | 188/322.13 |
| 2019/0176557 A1* | 6/2019 | Marking | F16F 9/462 |
| 2020/0378464 A1 | 12/2020 | Becker | |

FOREIGN PATENT DOCUMENTS

| | | |
|---|---|---|
| DE | 102018003262 | 10/2018 |
| DE | 102019220577 | 7/2020 |
| EP | 0979772 | 2/2000 |
| JP | 1977-156051 U | 5/1977 |
| JP | 1979-015193 U | 1/1979 |
| JP | 1981-158389 U1 | 11/1981 |
| JP | 1984-16291 | 1/1984 |
| JP | 2004-345366 | 12/2004 |
| JP | 2008025679 | 2/2008 |
| TW | 202112600 | 4/2021 |

OTHER PUBLICATIONS

"The MRP Ribbon Has Landed", Website: https://nsmb.com/articles/mrp-ribbon-has-landed, Mar. 21, 2017, last checked Jan. 16, 2023.
"Works connection fork bleeder valves", Website: https://web.archive.org/web/20111121095041/https://www.crfsonly.com/catalog/product_info.php/products_id/3761, last checked Sep. 1, 2022.

* cited by examiner

FIG. 3
FIG. 4
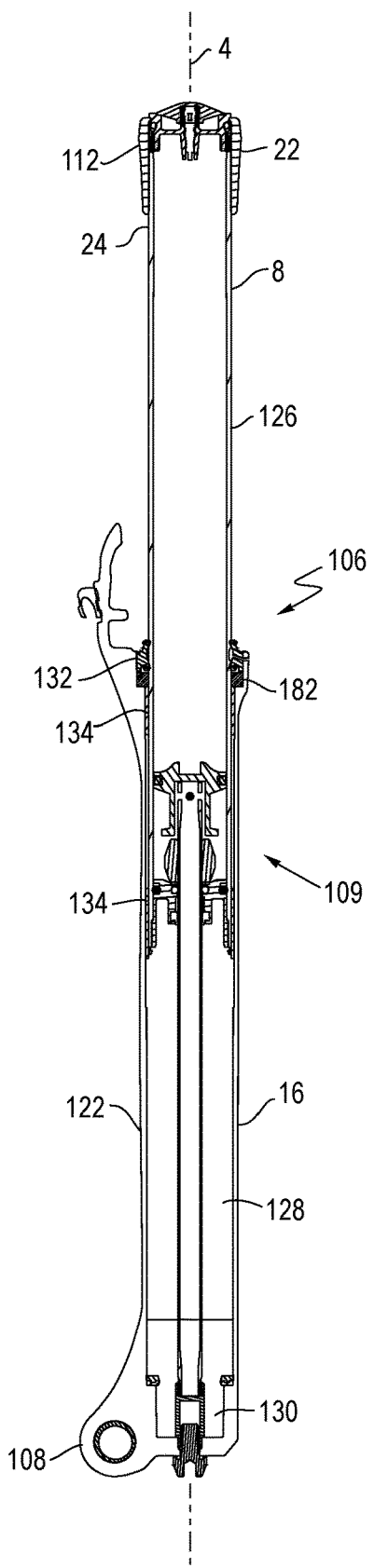
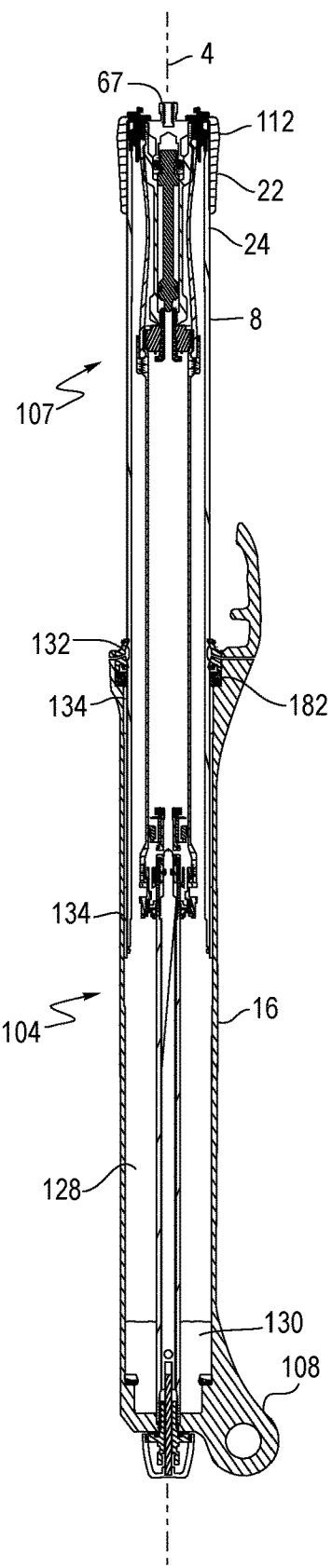

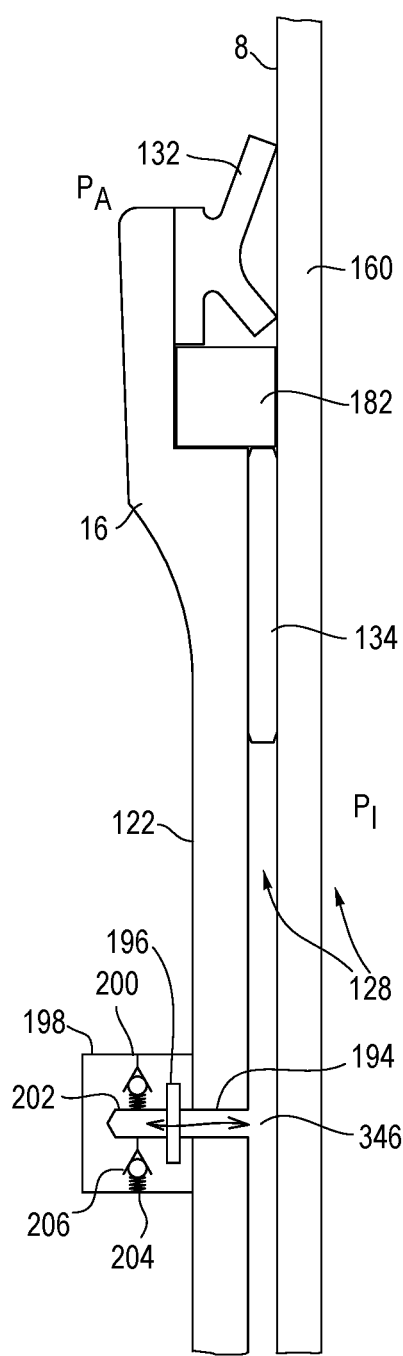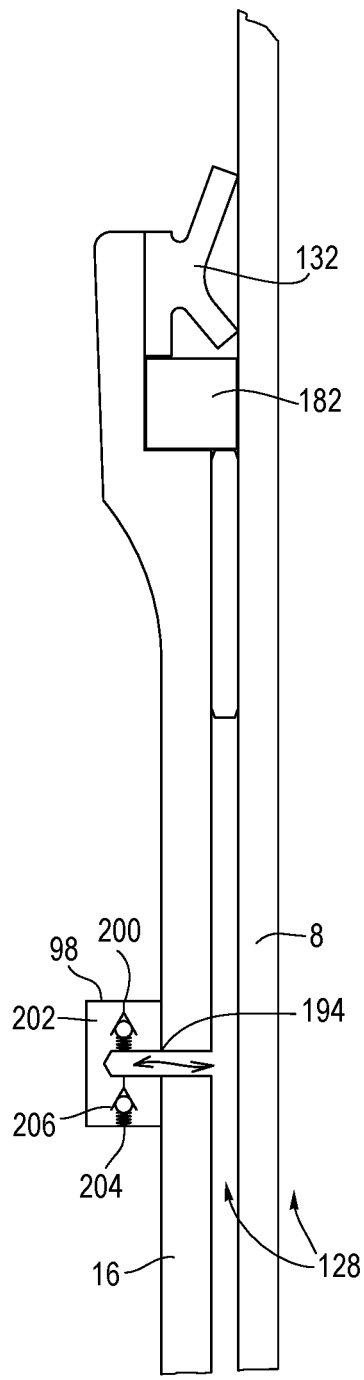

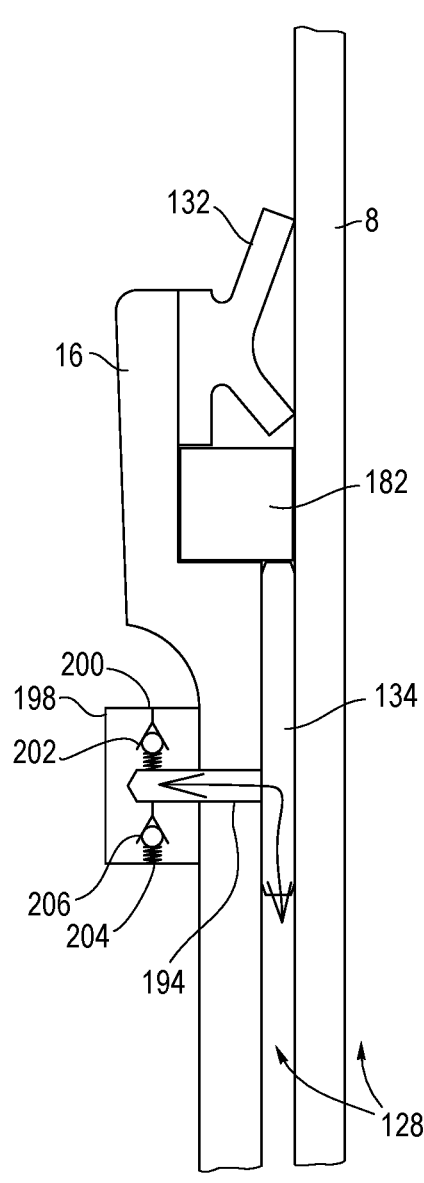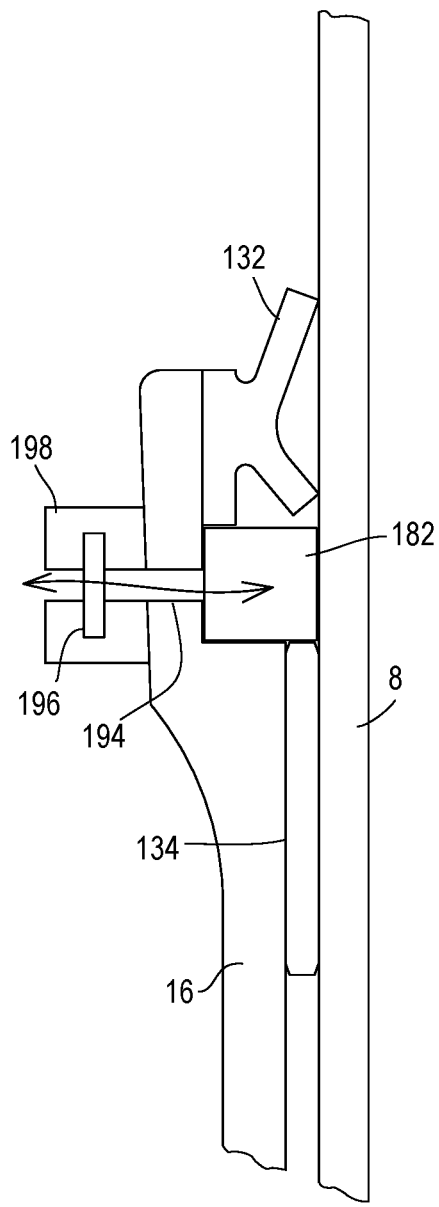

FIG. 19A
FIG. 19B
FIG. 20
FIG. 21
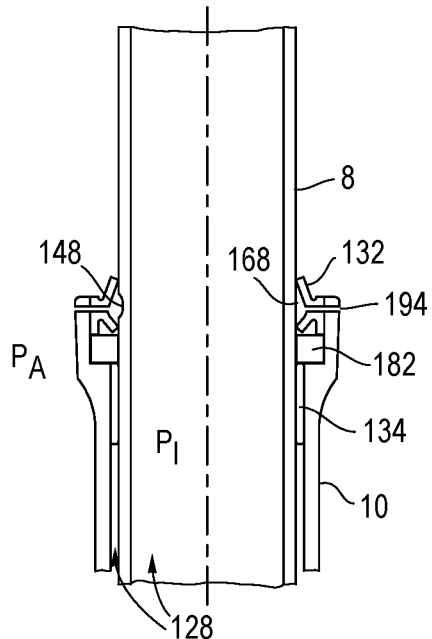
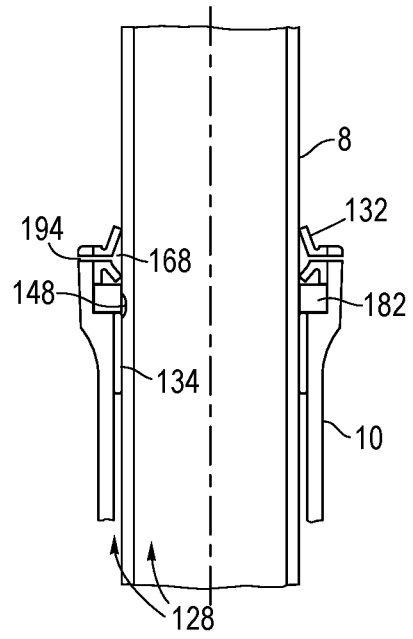
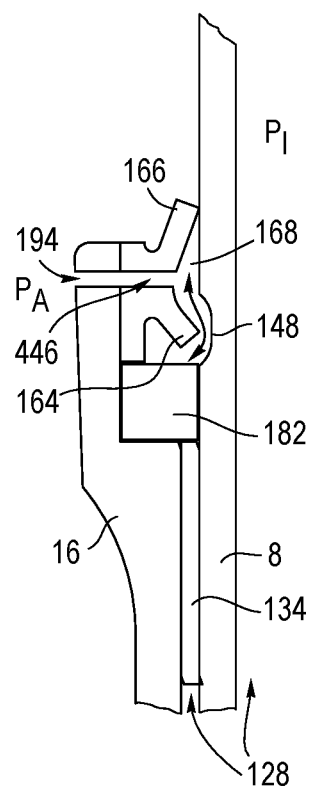
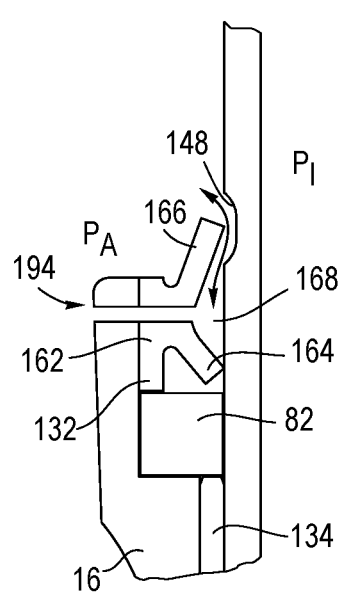

FIG. 27A
FIG. 27B
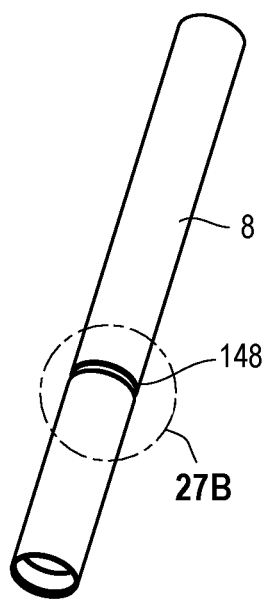
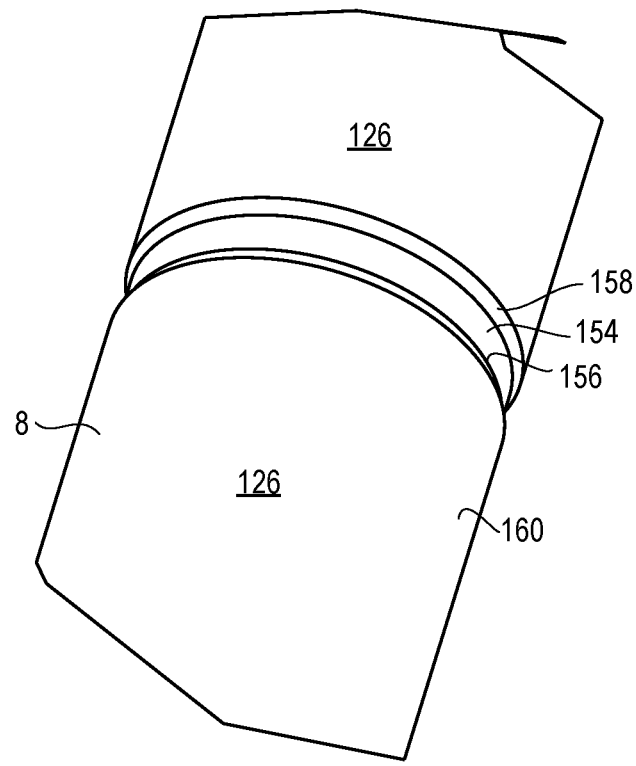

BICYCLE SUSPENSION SYSTEM WITH AUTOMATIC VENTING

FIELD OF THE DISCLOSURE

The present application generally relates to a bicycle suspension system with automatic venting and pressurizing of a sealed chamber, which minimizes the pressure differential between the sealed chamber and the ambient environment.

BACKGROUND

Vehicles, such as bicycles and motorcycles, often include telescoping suspension systems, for example front suspension systems having telescoping tubes or cylindrical structural members. The suspension systems typically have spring and/or damper sub-systems disposed in the interior of, or between, one or more of the tubes/cylindrical structural members. The spring and damper sub-systems are typically "sealed" systems within the telescoping members that provide spring and damping rates to reduce forces on the vehicle and rider. The telescoping cylindrical structures may define sealed volume chambers surrounding the spring/damper sub-systems. The sealed volume chamber may seal lubricating oil inside the chamber while preventing environmental contaminants from entering the chamber.

The sealed volume chamber may experience a positive pressure or negative pressure (i.e., vacuum) relative to atmospheric pressure due to changes in altitude, atmospheric pressure or temperature, even when the system is at rest. This pressure differential may create significant pressure induced forces acting on the telescoping members in addition to the predetermined spring/damping rates of the sub-systems. The additional pressure induced forces may be undesirable to the user, for example by providing an unintended and involuntary harder or softer ride at different altitudes, atmospheric pressures and/or temperatures. While some systems have been developed for manually bleeding or pressurizing the suspension system to equalize the pressure of volume chamber relative to the atmospheric pressure of the ambient environment, such systems require both recognition of the pressure differential by the user and subsequent input by the user, which may require additional tools that are not conveniently portable or available to the user during use of the vehicle.

SUMMARY

In one aspect, one embodiment of a bicycle suspension system includes a first tube having a first interior surface and a first exterior surface, wherein the first exterior surface is exposed to an ambient environment at atmospheric pressure. A second tube includes a second interior surface and a second exterior surface, wherein the second tube is telescopically disposed in the first tube with at least a portion of the first interior surface facing and overlapping at least a portion of the second exterior surface. The first and second tubes are telescopically moveable relative to each other between at least an at-rest position, a compressed position and an extended position. The first interior surface and the second exterior surface define an interior chamber therebetween having a chamber pressure. A seal may be disposed between the first and second tubes and define in part the interior chamber. The difference between the chamber pressure and the atmospheric pressure defines a pressure differential. A bi-directional flow pathway is defined between the interior chamber and the ambient environment when the first and second tubes are in at least one or more of the at-rest position, the compressed position and the extended position. The bi-directional flow pathway automatically provides for (1) a first flow of air from the interior chamber to the ambient environment when the pressure differential is greater than a first predetermined pressure differential, and (2) a second flow of air from the ambient environment to the interior chamber when the pressure differential is less than a second predetermined pressure differential.

In another aspect, one embodiment of a bicycle suspension system includes a first tube having a first interior surface and a first exterior surface, wherein the first exterior surface is exposed to an ambient environment at atmospheric pressure. A second tube includes a second interior surface and a second exterior surface. The second tube is telescopically disposed in the first tube with at least a portion of the first interior surface facing and overlapping at least a portion of the second exterior surface. The first and second tubes are telescopically moveable relative to each other between at least an at-rest position, a compressed position and an extended position. The first interior surface and the second exterior surface define an interior chamber therebetween. The second tube includes a by-pass volume formed on the second exterior surface. A seal may be disposed between the first and second tubes and define in part the interior chamber. In one embodiment, the first tube includes a seal engaging the second exterior surface of the second tube and at least one vent hole formed through at least one of the first tube and the seal. The seal includes spaced apart lower and upper lips. The lower lip is momentarily aligned with the by-pass volume, and the at least one vent hole is in fluid communication with the by-pass volume, as the first and second tubes are moved between, or positioned at one of, the at-rest position and the compressed position.

In another aspect, one embodiment of a bicycle suspension system includes a first tube having a first interior surface and a first exterior surface, wherein the first exterior surface is exposed to an ambient environment at atmospheric pressure. A second tube includes a second interior surface and a second exterior surface. The second tube is telescopically disposed in the first tube with at least a portion of the first interior surface facing and overlapping at least a portion of the second exterior surface. The first and second tubes are telescopically moveable relative to each other between at least an at-rest position, a compressed position and an extended position. The first interior surface and the second exterior surface define an interior chamber therebetween. The second tube includes a by-pass volume formed on the second exterior surface. The first tube includes a seal engaging the second exterior surface of the second tube, wherein the seal is momentarily aligned with the by-pass volume as the first and second tubes are moved to at least one of the at-rest position, the compressed position and the extended position. A first pathway is defined to the ambient environment through the by-pass volume when the first and second tubes are in one of the at-rest, compressed or extended positions. A second pathway is defined from the interior chamber through the by-pass volume when the first and second tubes are in one of the at-rest, compressed or extended positions.

In another aspect, one embodiment of a method of using a bicycle suspension system includes reciprocally and telescopically moving a first tube having a first interior surface and a first exterior surface relative to a second tube having a second interior surface and a second exterior surface, wherein the second tube is telescopically disposed in the first tube with at least a portion of the first interior surface facing and overlapping at least a portion of the second exterior surface. The first exterior surface is exposed to an ambient environment at atmospheric pressure, while the first interior surface and the second exterior surface define an interior chamber therebetween having a chamber pressure. The method further includes creating a bi-directional flow pathway between the interior chamber and the ambient environment while reciprocally and telescopically moving the first tube relative to the second tube, providing a flow of air from the interior chamber to the ambient environment through the flow pathway while reciprocally and telescopically moving the first tube relative to the second tube if the chamber pressure is greater than the atmospheric pressure, and providing a flow of air from the ambient environment to the interior chamber through the flow pathway while reciprocally and telescopically moving the first tube relative to the second tube if the chamber pressure is less than the atmospheric pressure.

The various embodiments of the bicycle suspension system, the bicycle and the methods for the use and assembly thereof provide significant advantages over other bicycle suspension systems and methods. For example and without limitation, the bicycle suspension system eliminates the need for a manually operated valve, or manual intervention by the user during use, in order to equalize the internal pressure of the sealed chamber with the atmospheric pressure of the ambient environment. Rather, the suspension system automatically vents or pressurizes the sealed volume chamber, through bi-directional flow, without any user intervention, whether by way of normal operation of the suspension system in some embodiments, at-rest in other embodiments, or some combination of in-use and/or at-rest venting and pressurizing.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present invention will become apparent upon reading the following description in conjunction with the drawing figures, in which:

FIG. 3 is a cross-sectional view of the front suspension system taken along line 3 of FIG. 2.

FIG. 4 is a cross-sectional view of the front suspension system taken along line 4 of FIG. 2.

FIG. 15A is an enlarged partial cross-sectional view of the seal and by-pass volume interface shown in FIG. 14.

FIG. 15B is an enlarged partial cross-sectional view of the seal and by-pass volume interface shown in FIG. 14 without a filter.

FIG. 17 is an enlarged partial cross-sectional view of another embodiment of a suspension system.

FIG. 18 is an enlarged partial cross-sectional view of another embodiment of a suspension system.

FIGS. 19A and B are partial cross-sectional views of another embodiment of a suspension system in an at-rest position and a compressed position respectively.

FIG. 20 is an enlarged partial cross-sectional view of the seal and by-pass volume interface shown in FIG. 19 in a compressed position.

FIG. 21 is an enlarged partial cross-sectional view of the seal and by-pass volume interface shown in FIG. 19 in an extended position.

FIG. 27A is a perspective view of another embodiment of a tube with a by-pass volume formed on an exterior surface thereof.

FIG. 27B is an enlarged view of the by-pass volume shown in FIG. 27A.

DETAILED DESCRIPTION OF THE DISCLOSURE

It should be understood that the term "plurality," as used herein, means two or more. The term "longitudinal," as used herein means of or relating to a length or lengthwise direction 2, for example a direction running along a length of a tube 8 as shown in FIG. 2, but is not limited to a linear path, for example if the tube is curved or curvilinear. The term "lateral," as used herein, means situated on, directed toward or running in a side-to-side direction. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle 50, shown in FIG. 1, from the perspective of a user seated thereon. The term "transverse" means non-parallel. The terms "outer" and "outwardly" refers to a direction or feature facing away from a centralized location, for example the phrases "radially outwardly," "radial direction" and/or derivatives thereof, refer to a feature diverging away from a centralized location, for example a central axis 4 of the tube 8 as shown in FIGS. 3 and 4. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle 50.

Figure 1:
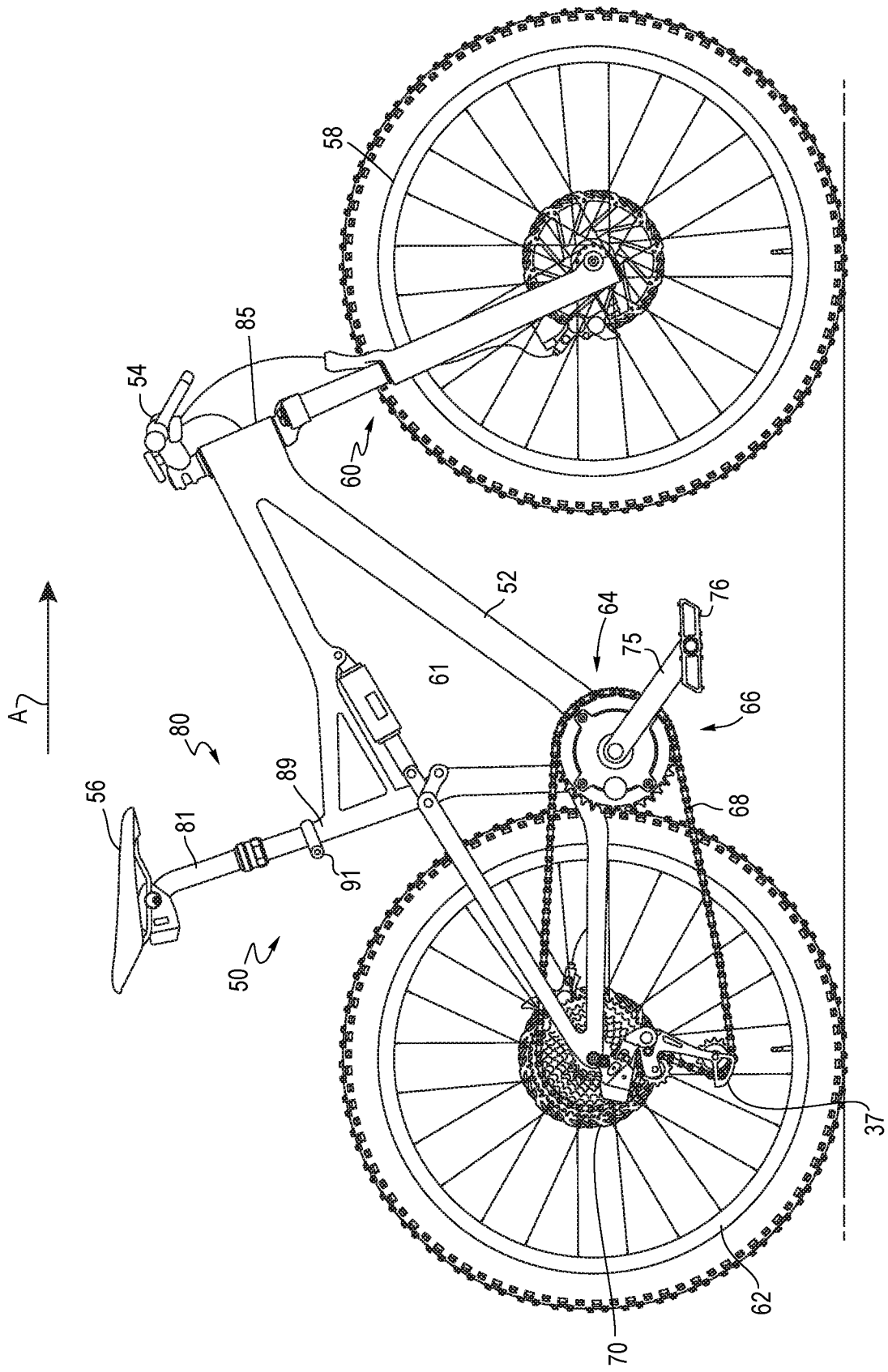
FIG. 1 is a side view of one example of a bicycle including a suspension system.
Figure 2:
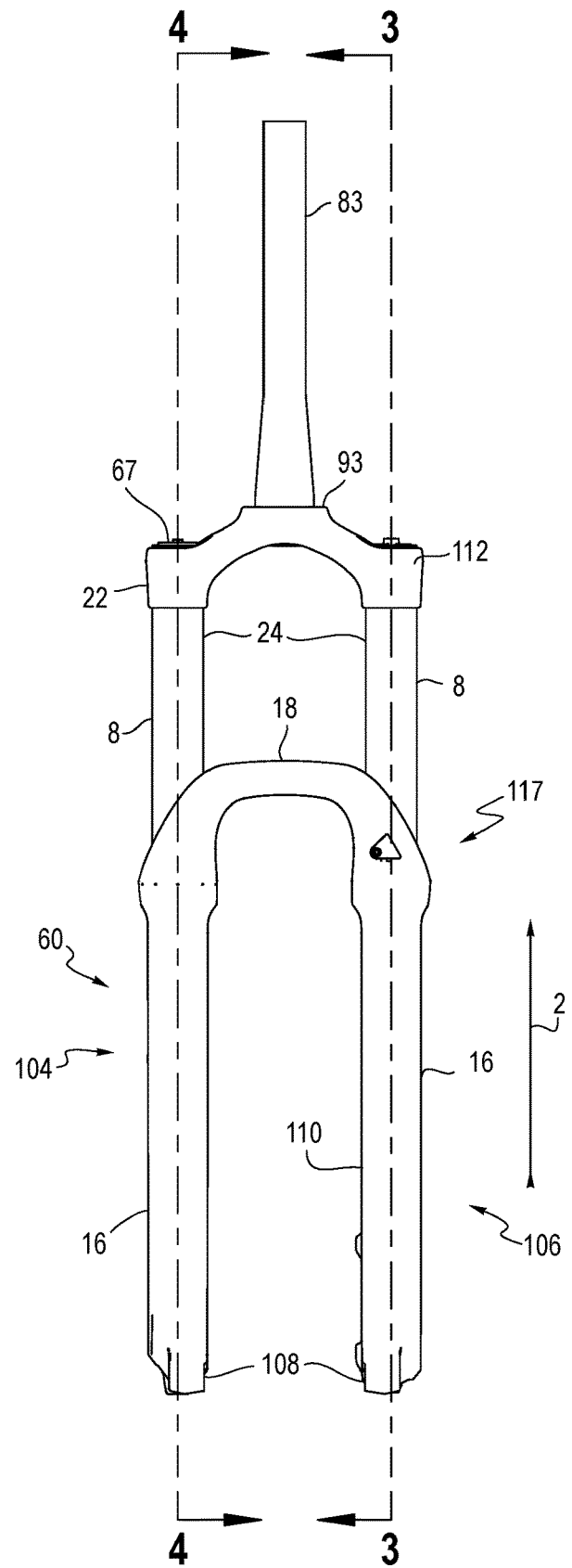
FIG. 2 is a front view of a front suspension system for a bicycle.

FIG. 1 illustrates one example of a bicycle, defined as a two-wheeled vehicle that may be motorized, human powered, or a combination thereof. The bicycle includes a suspension assembly, shown for example as a front fork suspension assembly 60. In this example, the vehicle is one possible type of bicycle 50, such as a mountain bicycle. The bicycle 50 has a frame 52, handlebars 54 near a front end of the frame, and a seat or saddle 56 for supporting a rider over a top of the frame. The bicycle 50 also has a first or front wheel 58 carried by a front fork suspension assembly 60 or system supporting the front end of the frame. The bicycle 50 also has a second or rear wheel 62 supporting a rear end of the frame 52. The rear end of the frame 52 may be supported by a rear suspension component 61, such as a rear shock. The bicycle 50 also has a drive train 64 with a crank assembly 66 that is operatively coupled via a chain 68 to a rear cassette 70 near the hub providing a rotation axis of the rear wheel 62. The crank assembly 66 includes at least one, and typically two, crank arms 75 and pedals 76, along with at least one front sprocket, or chain ring 77. A rear gear change device 37, such as a derailleur, is disposed at the rear wheel 62 to move the chain 68 through different sprockets of the cassette 70. In one embodiment, a front gear changer device, such as a derailleur, may be provided to move the chain 68 through multiple sprockets of the crank assembly. In the illustrated example, the saddle 56 is supported on a seat post subassembly 80, including a tube 81 having an end portion received in a top of a frame seat tube 89 of the frame, which defines a socket. A clamping ring 91 may be tightened to secure the upper seat tube 81 to the lower frame seat tube 89.

In FIG. 1, the arrow A depicts a normal riding or forward moving direction of the bicycle 50. While the bicycle 50 depicted in FIG. 1 is a mountain bicycle, the suspension assembly 60, including the specific embodiments and examples disclosed herein as well as alternative embodiments and examples, may be implemented on other types of bicycles and vehicles, including for example motorcycles. For example, the disclosed front fork suspension assembly 60 may be used on road bicycles, as well as bicycles with mechanical (e.g., cable, hydraulic, pneumatic, etc.) and non-mechanical (e.g., wired, wireless) drive systems, and/or powered drive systems, whether gas or electric.

Now referring to FIGS. 2-4, the suspension assembly 60, or front fork assembly of FIG. 1, is shown as isolated from the rest of the bicycle. The suspension assembly 60 includes a steering tube 83 configured for attachment to the handlebars 54 and the bicycle frame 52. The suspension assembly 60 also includes at least one leg configured for rotatable attachment to a front wheel. In the displayed embodiment, the suspension assembly 60 includes a first leg 104 and a second leg 106. The at least one leg includes a suspension system. The suspension system may include both a damping system, or damper 107, and a spring system 109. The two systems function together to form the suspension system. In the illustrated embodiment, the first leg 104 includes the damper 107 and the second leg 106 includes the spring system 109, although either leg may include the damper and/or spring system. In an embodiment, the suspension assembly may include merely a single leg with a damper and spring included in the single leg.

The first leg 104 and/or the second leg 106 may be constructed of telescoping bars or tubes 8, 16 called stanchions. The first leg 104 and/or the second leg 106 may include an upper or inner tube 8 or stanchion and a lower tube 16 or stanchion. In one embodiment, the lower tubes 16 of both the first leg 104 and the second leg 106 are formed of a single piece lower tube construction, which includes a bridge 18 configured to attach the two lower tubes 16.

The suspension assembly 60 also may include one or more wheel attachment features 108, such as holes or dropouts configured for wheel hub attachment. The front fork suspension assembly 60 may also include brake attachment features 110, configured for attachment to wheel braking devices, such as disk brake calipers. For example, the brake attachment features may include raised protrusions and holes for fastener attachment to the calipers. In an embodiment, such as the illustrated embodiment, the wheel attachment features 108 and the brake features 110 are included on a front fork component that is connected to both legs. For example, the front fork component may be a single piece lower tube construction, or fork lower part 111, which includes the pair of tubes 16. The fork lower part may include wheel attachment features 108 and/or the brake features 110. The single piece lower tube construction may be formed of a single material, such as a magnesium alloy, aluminum alloy, or other materials. In one embodiment, the single piece lower tube construction is formed through a casting processes. Further machining or forming processes may be used to form specific features, shapes, and/or surfaces of the single piece lower tube.

The suspension assembly 60 may also include a piece forming the tops of one or both legs, such as a front fork crown 112. The front fork crown 112 may be formed of a single piece that spans or forms the top of both the first leg 104 and the second leg 106. In one embodiment, the front fork crown is formed of a single material, such as aluminum or other materials. In one embodiment, the front fork crown is formed through a forging processes. Further machining or forming processes may be used to form specific features, shapes, and/or surfaces of the front fork crown, including for example a pair of boss structures 22 defining downwardly opening sockets dimensioned and shaped to receive end portions 24 of the upper, or inner tubes 8.

The steerer tube 83 is secured to a center hub portion 93 of the front fork crown and extends upwardly therefrom in the longitudinal direction 2. The steerer tube 83 is inserted in and coupled to a head tube 85 component of the frame 52 with one or more bearings, otherwise referred to as a headset, which facilitates rotation between the steerer tube 83 and the head tube 85.

The suspension assembly 60 may also include a suspension element control device 67. In one embodiment, the suspension element control device may be attached to, or at least partially integrated with, the front fork crown 112. The suspension element control device 67 is configured to modify, adapt, or otherwise change a state of the suspension system. In the illustrated embodiment the suspension element control device is configured to change an operational state, or one or more operating characteristics, of the damper 107. As shown in FIG. 4, the damper 107 is a mechanical device configured to dissipate energy input to the suspension component due to impact or impulse forces being applied to the suspension component. Various dampers may include hydraulic, mechanical, or pneumatic damping mechanisms, or combinations of mechanical, pneumatic, and/or hydraulic damping mechanisms.

Figure 8:
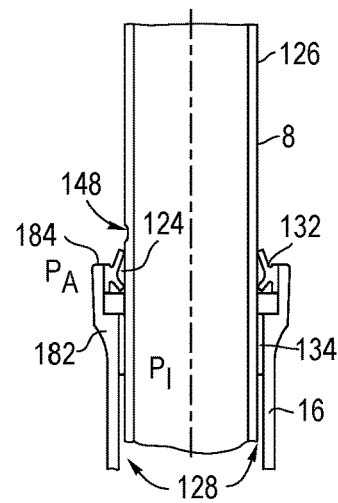
FIG. 8 is a partial cross-sectional view of the suspension system shown in FIG. 5 in an extended position.

Referring to FIGS. 5-24, both the first and second legs 104, 106 include an outer tube 16 and an inner tube, with the outer tube 16 having an interior surface 120 and an exterior surface 122 exposed to an ambient environment at atmospheric pressure $P_A$. The inner tube 8 also includes an interior surface 124 and an exterior surface 126. As mentioned, the tube 8 is telescopically disposed in the tube 16 with at least a portion of the first interior surface 120 facing and overlapping at least a portion of the second exterior surface 126. While the tube 8 is shown as an upper tube, it should be understood that the positions may be reversed, with the inner tube 8 being the lower tube. In this way, the upper or inner tubes 8 are shown telescopingly sliding into the lower structure or outer tube 16, but may be configured in an "inverted" layout where the lower structure or tube 16 telescopingly slides into the upper structure or tube 8. The inner and outer tubes 8, 16 are telescopically moveable relative to each other between at least an at-rest position (see FIG. 5), a compressed position (see FIG. 6) and an extended position (see FIG. 8). The inner tube 8 moves inwardly (e.g., downwardly in one embodiment) relative to the outer tube 16 in the compressed position, and moves upwardly or outwardly relative to the outer tube 16 in an extended position. The "at-rest position" refers to the relative position of the inner and outer tubes 8, 16 when no load is being applied to the frame 52 or handlebars 54 by the user. The "compressed position" refers to any relative position of the inner and outer tubes 8, 16 as the inner tube 8 is moved inwardly relative to the outer tube 8, and includes a maximum compressed position wherein the inner and outer tubes 8, 16 bottom out. The "extended position" refers to any relative position of the inner and outer tubes 8, 16 as the inner tube 8 is moved outwardly relative to the outer tube 16, and includes a maximum extended position wherein the inner and outer tubes top out.

The inner and outer tubes 8, 16, including the space of gap defined between the interior surface 120 of the outer tube 16 and the exterior surface 126 of the inner tube 8, define an interior chamber 128 therebetween. The interior chamber 128 may be sealed so as to ensure that a lubricating fluid 130 (see, e.g., FIG. 14) disposed in the interior chamber is prevented from leaking outside the chamber, and also to prevent contaminants, such as dust and dirt, from entering the chamber. For example, a seal 132 may be disposed between the exterior surface of the inner tube 8 and the interior surface of the outer tube 16. The seal 132 may be secured to the tube 16, for example to an interior surface at a top end thereof, or to the tube 8, for example an exterior surface thereof. The interior chamber 128 has a pressure $P_I$. The seal 132 slidingly engages and slides along the exterior surface 126.

Figure 28:
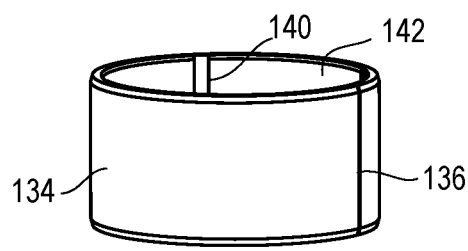
FIG. 28 is a perspective view of one embodiment of a bushing.
Figure 29:
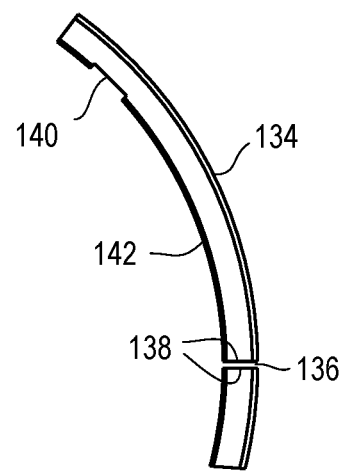
FIG. 29 is a partial top view of the bushing shown in FIG. 28.
Figure 30:
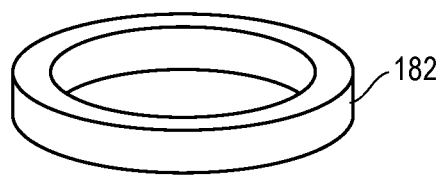
FIG. 30 is a perspective view of one embodiment of an absorbent.
Figure 31:
FIG. 31 is a perspective view of one embodiment of a filter.

A pair of longitudinally spaced bushings 134 are disposed in the interior chamber between the exterior surface of the tube 8 and the interior surface of the tube 16 below the seal. The bushings 134 provide a sliding interface between the inner and outer tubes 8, 16. Referring to FIGS. 28 and 29, the bushings 134 are each formed as an annular ring, which may have a split ring configuration with a small gap 136 or split formed between adjacent ends 138 of the ring. In addition, each bushing 134 may include one or more reliefs 140 formed on an interior surface 142 of the bushing, with the relief extending across the entire height of the bushing. One or more relief(s) may also, or alternatively, be formed on an exterior surface of the bushing in some embodiments. The gap 136 and/or relief(s) 140 provide a bushing flow pathway from one end of the bushing to the other, and allow for fluid communication from one end to the other, such that the spaces above and below the bushing 134 define in part the interior chamber 128. As such, the interior chamber 128 includes the volume between the tubes 8, 16 above and below the bushing 134, with the chamber pressure $P_I$ being equalized through the bushing flow pathway defined by the gap 136 and/or relief(s) 140.

The difference between the chamber pressure and the atmospheric pressure defines a pressure differential ($P_D = P_I - P_A$). The pressure differential ($P_D$) may be positive or negative, and may vary depending for example on the atmospheric pressure, which is variable. For example, the bicycle 50 may experience a change in atmospheric pressure ($P_A$) when the user is riding the bicycle at different elevations, with the atmospheric pressure decreasing relative to elevation, such that the pressure differential ($P_D$) may increase at higher elevations and decrease (e.g., become negative or create a vacuum) at lower elevations. It should be understood that the absolute value of the pressure differential ($P_D$) may increase at both higher and lower elevations depending on the chamber pressure $P_I$. Similar pressure differentials ($P_D$) may be experienced due to atmospheric pressure changes at the same elevation, produced for example by storm events or temperature changes, even when the bicycle and suspension assembly is at rest.

Referring to FIGS. 5-24, various embodiments of the suspension assembly 60 create or define a bi-directional flow pathway 144, 146, 346, 446 between the interior chamber 128 and the ambient environment when the first and second, e.g., inner and outer, tubes 8, 16 are in at least one or more of the at-rest position, the compressed position and the extended position. It should be understood that the bi-direction flow pathway may be defined in one or both of the first and second legs 104, 106. The bi-directional flow pathway 144, 146, 346, 446 automatically provides for (1) a first flow of air from the interior chamber 128 to the ambient environment when the pressure differential ($P_D$) is positive or greater than a first predetermined pressure differential (defined as "venting"), and (2) a second flow of air from the ambient environment to the interior chamber 128 when the pressure differential ($P_D$) is negative or less than a second predetermined pressure differential (defined as "pressurizing"). As used herein, the term "automatic" refers to an action that occurs during the normal use and riding of the bicycle 50 and suspension assembly 60 or system, for example when the bicycle is being ridden with resultant compression and extension of the suspension assembly, or when the suspension system and bicycle are at rest without the user interfacing with the suspension assembly, or a combination of normal use and at-rest sequences. The term "automatic" expressly does not include any user intervention other than the normal use/riding interaction with the suspension system, and explicitly does not include the manual actuation or intervention by the user, directly or indirectly, of any valve or actuator to bleed or relieve the pressure differential whether by venting or pressurizing the interior chamber 128. In one embodiment, the bi-directional flow pathway is configured as a "position" sensitive or "position" dependent pathway, wherein the relative positions of the tubes 8, 16 dictate when the bi-directional flow pathway communicates between the interior chamber and the ambient environment. In other embodiments, the bi-directional flow is "position" independent, meaning the bi-directional flow pathway is not dictated by the relative positions of the tubes 8, 16.

The bi-directional flow pathway (1) may be direct and continuous between the interior chamber and the ambient environment (e.g., a pathway 346 through a vent hole positioned below the seal (FIGS. 14-18)) and is "position" independent, (2) may be direct and intermittent, for example a pathway 446 from the interior chamber to an intermediate location (e.g., seal volume 168) through the by-pass volume and then simultaneously to the ambient environment from the seal volume 168 through a vent hole 194 or the by-pass volume 148 (FIGS. 10B, 12-13B, 19-24) or vice versa and is "position" dependent, or (3) may be discontinuous and intermittent (and "position" dependent), for example including a first flow pathway 146 from the interior chamber to an intermediate location (e.g., seal volume 168) through the by-pass volume 148 at a one or more first times (e.g., up/down movement of the seal lower lip past the by-pass volume), and a second flow pathway 144 from the intermediate location, defined by the seal volume 168 in one embodiment, to the ambient environment through the by-pass volume 148 at a one or more second times (e.g., up and down movement of the seal upper lip past the by-pass volume) different than the first time (FIGS. 5-9B), and/or vice versa, including a third pathway from the ambient environment to an intermediate location (e.g., seal volume 168) through the by-pass 148 at one or more third times, and a second pathway from the intermediate location, defined by the seal volume 168 in one embodiment, to the interior chamber 128 through the by-pass volume 148 at one or more fourth times different than the third time. It should be understood that the first and fourth times may be the same, and the second and third times may be the same, with the flow pathway determined by the differential pressures between the interior chamber, intermediate location and the ambient environment.

Figure 9A:
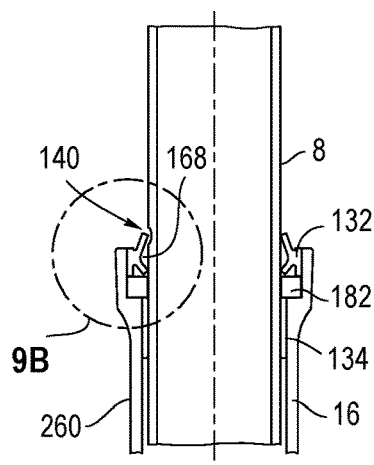
FIG. 9A is a partial cross-sectional view of the suspension system shown in FIG. 5 between the extended and at-rest position.
Figure 9B:
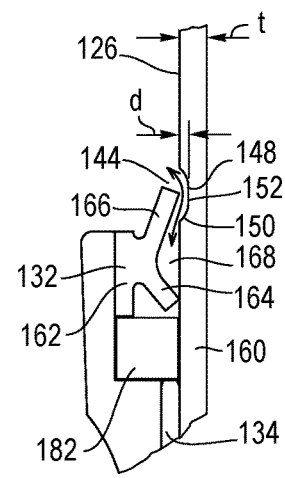
FIG. 9B is an enlarged partial cross-sectional view of the seal and by-pass volume interface shown in FIG. 9A.
Figure 10A:
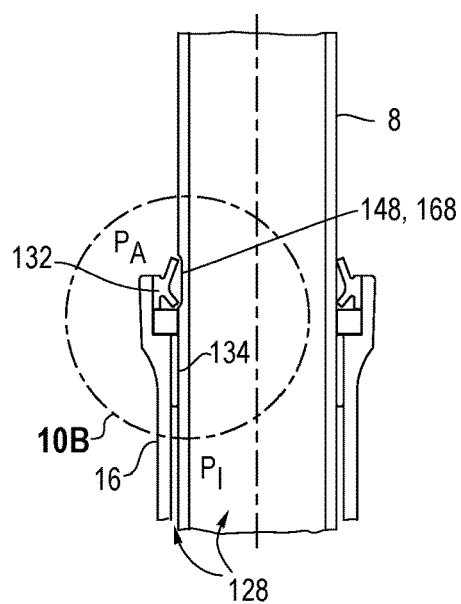
FIG. 10A is a partial cross-sectional view of another embodiment of a suspension system in an at-rest position.
Figure 10B:
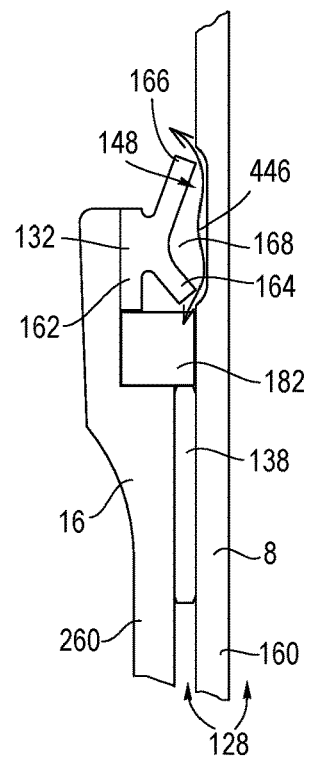
FIG. 10B is an enlarged partial cross-sectional view of the seal and by-pass volume interface shown in FIG. 10A.
Figure 11A:
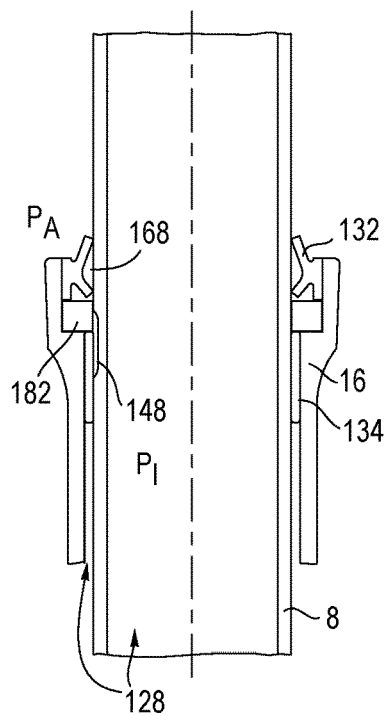
FIG. 11A is a partial cross-sectional view of the suspension system shown in FIG. 10A in a compressed position.
Figure 11B:
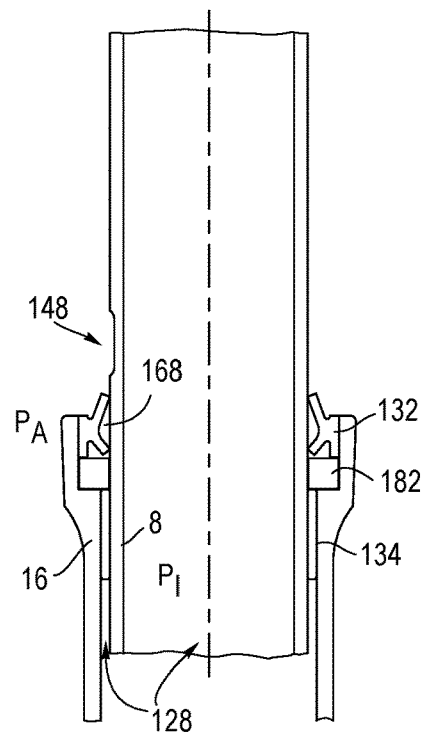
FIG. 11B is a partial cross-sectional view of the suspension system shown in FIG. 10A in an extended position.
Figure 25A:
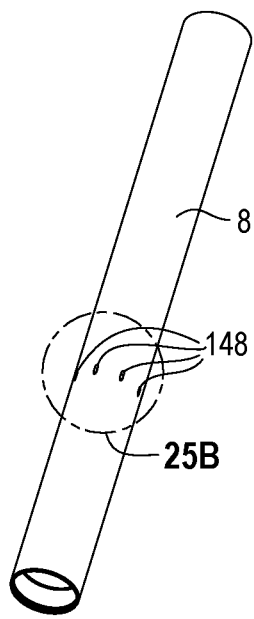
FIG. 25A is a perspective view of one embodiment of a tube with a plurality of by-pass volumes formed on an exterior surface thereof.
Figure 25B:
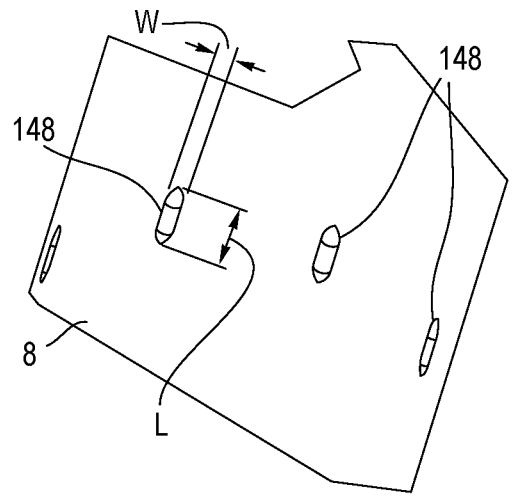
FIG. 25B is an enlarged view of the by-pass volumes shown in FIG. 25A.
Figure 26A:
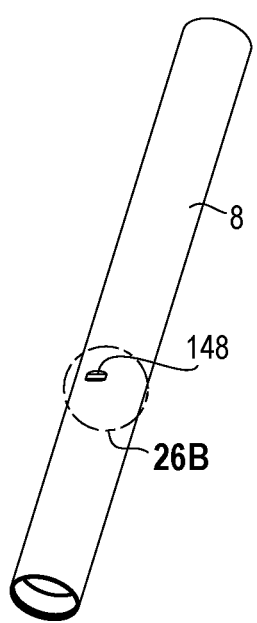
FIG. 26A is a perspective view of another embodiment of a tube with a by-pass volume formed on an exterior surface thereof.
Figure 26B:
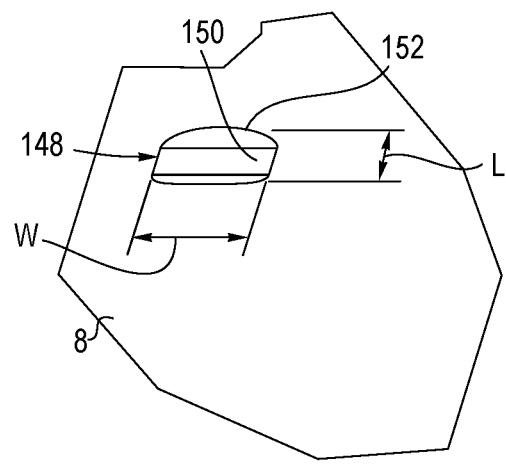
FIG. 26B is an enlarged view of the by-pass volume shown in FIG. 26A.

In one embodiment of the bicycle suspension assembly 60 or system, and referring to FIGS. 5-13B and 19-27B, the tube 16 includes the seal 132 and the tube 8 includes at least one by-pass volume 148 formed on the exterior surface 126. It should be understood that the inner tube 8 may include the seal with the outer tube 16 configured with the by-pass volume. In one embodiment, the inner tube 8 is configured with a single by-pass volume 148, while in other embodiments, shown for example in FIG. 25A, a plurality of by-pass volumes 148 are circumferentially spaced around the exterior surface 126 of the inner tube. By-pass volumes may also be longitudinally spaced along the tube 8. In one embodiment, the by-pass volume 148 is defined as a dimple, or recess formed in the exterior surface of the tube, with the by-pass volume having a depth (d) less than the wall thickness (t) of the inner tube 8 as shown in FIG. 9B. The by-pass volume 148 may have a circumferential width (w) and an axial length (L), with the length (L) being greater than the width (w) in one embodiment (FIG. 25B), and the width (w) being greater than the length (L) in another embodiment (FIG. 26B). Of course, the width and length may be the same, for example when the by-pass volume 148 is circular. The interior wall of the by-pass volume 148 may be concave, with curved side walls 150, and a flat bottom 152 in some embodiments. Referring to FIGS. 27A and B, the by-pass volume is configured as an annular recess 154 extending around an entire perimeter of the exterior surface of the tube 8, or interior surface of the tube 16. The recess 154 may have curved top and bottom walls 158 transitioning to the exterior surface 126, and a flat 156 circumferential bottom. In any of the embodiments, the by-pass volume 148 defines a cavity in the wall 160 of the tube. The by-pass volume may be defined as a seal-surface interruption, meaning a space is created between the sealing surfaces to create a flow pathway. The space may be created by a recess extending radially inwardly from the surface of the tube, or the space may be created an outer protuberance extending radially outwardly from the exterior surface of the tube, including for example and without limitation a surface roughness that compromises sealing.

In one embodiment of the bicycle suspension system, and referring to FIGS. 5-11B and 14-24 and 32-35, the seal 132 has a K-shaped cross section, with an annular base portion 162 that may be engaged or coupled to the interior surface 120 of the outer tube 16 and spaced apart annular lower and upper lips 164, 166 or legs, with the lower lip 164 extending downwardly and inwardly from the base portion, and the upper lip 166 extending upwardly and inwardly from the base portion. The upper and lower lips 164, 166 are resilient and flexible and slidingly engage the exterior surface 126 of the inner tube 8 to create a seal that seals the interior chamber 128 relative to the ambient environment. It should be understood in this respect, the interior chamber 128 includes any interior space below the seal 132, or interiorly spaced from the ambient environment by the seal. The upper and lower lips 164, 166 define a seal volume 168 therebetween, defined as a cavity between the seal 132 and the exterior surface 126 of the inner tube 8. In this way, the seal volume 168 is defined by the interior surface 174 of the base portion, and upper and lower lips.

Figure 32:
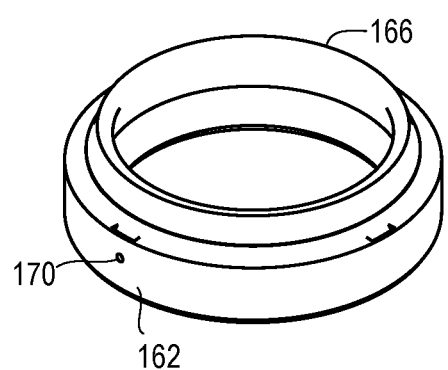
FIG. 32 is a perspective view of one embodiment of a seal.
Figure 33:
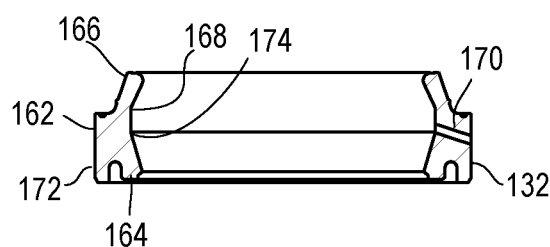
FIG. 33 is a cross-sectional view of the seal shown in FIG. 32.
Figure 34:
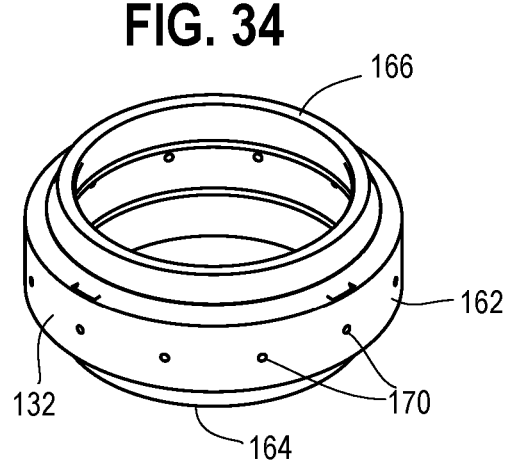
FIG. 34 is a perspective view of another embodiment of a seal.
Figure 35:
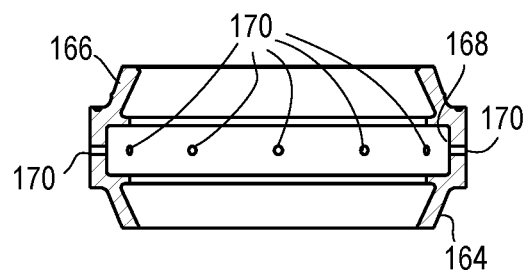
FIG. 35 is a cross-sectional view of the seal shown in FIG. 32.

In one embodiment, shown in FIGS. 32 and 33, a vent hole 170 is formed through the base portion 162 of the seal 132 in communication with the seal volume 168, with the vent hole 170 providing flow communication between an exterior surface 172 of the seal and the interior surface 174 of the seal, or the seal volume 168 defined thereby, between the upper and lower lips 164, 166. In another embodiment, shown in FIGS. 34 and 35, a plurality of vent holes 170 are circumferentially spaced around the base portion 162 and seal 132. A seal may alternatively be configured with a single lip, or more than two lips. For example, in another embodiment, shown in FIGS. 12-13B, a seal 180 is formed as an O-ring, which may have a circular or elliptical cross-section, and does not define or provide any seal volume.

Referring to FIGS. 5-11B and 14-24, an air permeable absorbent 182 disposed between the interior surface 120 of the outer tube 16 and the exterior 126 surface of the inner tube 8 and between the bushing 134 and a proximal end 184 of the tube 16 exposed to the ambient environment. The absorbent 182 may be configured as an annular ring. The absorbent 182 permits the flow of gas, such as air, through the absorbent, but absorbs and prevents the transmission of liquids, such as lubricating oil. As such, the absorbent does not define a gas barrier within the interior chamber 128, but rather is disposed in and defines part of the interior chamber 128. The absorbent may be made of closed cell foam, open cell foam, or a sponge material formed from polymer based materials.

Figure 5:
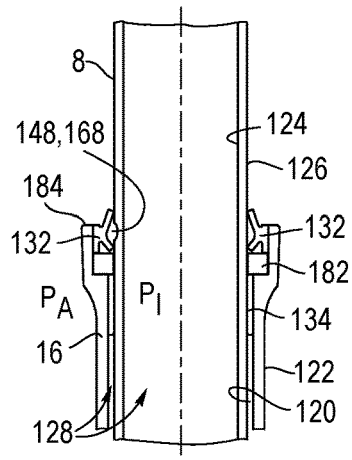
FIG. 5 is a partial cross-sectional view of one embodiment of a suspension system in an at-rest position.
Figure 6:
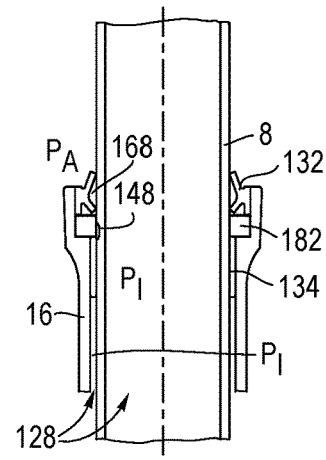
FIG. 6 is a partial cross-sectional view of the suspension system shown in FIG. 5 in a compressed position.
Figure 7A:
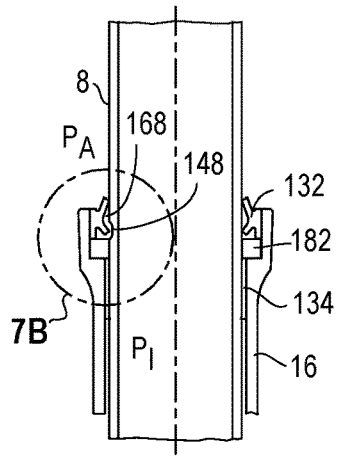
FIG. 7A is a partial cross-sectional view of the suspension system shown in FIG. 5 between the compressed and at-rest position.
Figure 7B:
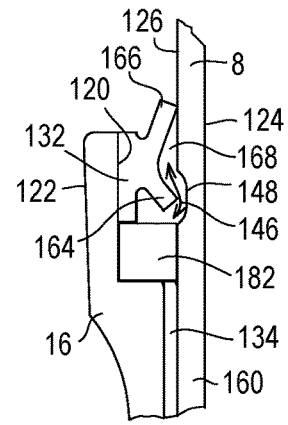
FIG. 7B is an enlarged partial cross-sectional view of the seal and by-pass volume interface shown in FIG. 7A.

Referring to the embodiment of FIGS. 5-9B, the bi-directional flow pathway 144, 146 includes a first flow pathway 144 from the seal volume 168 to the ambient environment through the by-pass volume 148 when the tubes 8, 16 are in one of the compressed or extended positions (see, e.g., FIG. 9B), and a second flow pathway 146 from the interior chamber 128 to the seal volume 168 through the by-pass volume 148 when the first and second tubes 8, 16 are in the other of the compressed or extended positions. For example, as shown in FIG. 5, the tubes 8, 16 are in an at-rest position, with the by-pass volume 148 disposed between the upper and lower lips 166, 164, or aligned with the seal volume 168 such that none of the interior chamber 128, by-pass volume 148 or seal volume 168 is in flow communication with the ambient environment. In FIG. 6, the tubes 8, 16 are in a maximum compressed position, with the by-pass volume 148 disposed below the lower lip 164 such that the by-pass volume 148 is in flow communication with the interior chamber 128, albeit through the absorbent 182. In the compressed position of FIGS. 7A and B, whether on a downward or upward motion, the by-pass volume 148 is momentarily aligned with the lower lip 164 as the tubes 8, 16 are moved back and forth between the at-rest position and the compressed positions, allowing or providing a flow pathway 146 through the by-pass volume 148 between the interior chamber 128 and the seal volume 168, or cavity between the lips. In this position, the lower lip 164, even if resilient biased inwardly, does not engage the bottom of the by-pass volume such that a flow pathway 146 is created. The upper lip 166 engages and seals against the exterior surface 126 above the by-pass volume 148. As the tubes 8, 16 travel back and forth between the at-rest position and extended position, shown in FIGS. 9A and B, the by-pass volume 148 is momentarily aligned with the upper lip 166, allowing or providing a flow pathway 144 through the by-pass volume between the seal volume 168, or cavity between the lips, and the ambient environment. In this position, the upper lip 166, even if resilient biased inwardly, does not engage the bottom of the by-pass volume 148 such that a flow pathway 144 is created. The lower lip 164 engages and seals against the exterior surface 126 below the by-pass volume 148. In other words, the interaction of the seal 132 and by-pass 148 volume results in intermittent gulping and transmission of air from the interior chamber 128 to the ambient environment, by way of the seal volume 168, if the pressure differential is positive, or greater than a first predetermined pressure differential ($P_{PD1}$), and from the ambient environment to the interior chamber 128, by way of the seal volume 168, if the pressure differential is negative or less than a second predetermined pressure differential ($P_{PD2}$), allowing the pressure differential to be minimized, or move toward zero (0), for example when the first and second predetermined pressure differentials ($P_{PD1}$, $P_{PD2}$) are zero (0). In this way, it should be understood that this flow pathway 144, 146 is bi-directional, depending on the pressure differential, meaning the flow may be directed from the ambient environment through the by-pass volume 148 to the seal volume 168, and then from the seal volume 168 through the by-pass volume 148 to the interior chamber 128, or vice versa. In this way, an intermittent bi-directional flow pathway is defined and created between the interior chamber 128 and the ambient environment. As such, with reciprocal telescoping action of the tubes 8, 16, the by-pass volume 148 may transport small volumes of differential pressure air past the seal 132, or the by-pass volume 148 may create momentary fluid communication of the sealed volume chamber 128 with the ambient environment. The volume transfer and/or momentary fluid communication equalizes differential pressure between the ambient environment and the interior chamber 128.

It should be understood that if the location of the seal and by-pass volumes are reversed, or if the inner/outer positions of the tubes are reversed, then the flow pathways may be defined by opposite actions of compression and extension of the tubes 8, 16.

Figure 12:
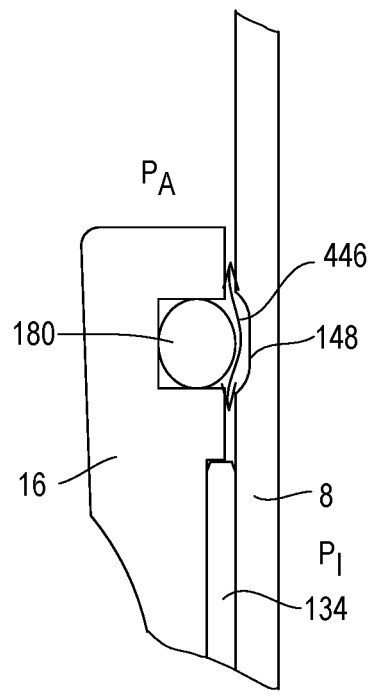
FIG. 12 is an enlarged partial cross-sectional view of another embodiment of a suspension system in an at-rest position.
Figure 13A:
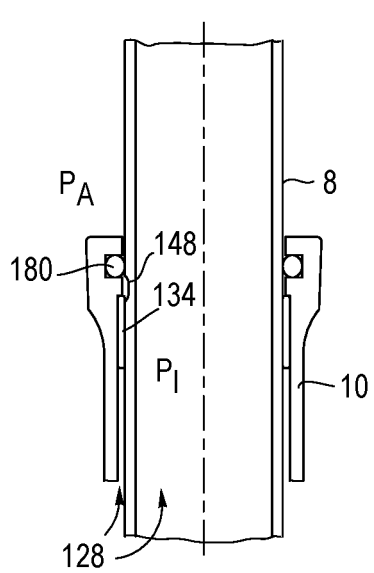
FIG. 13A is a partial cross-sectional view of the suspension system shown in FIG. 12 in a compressed position.
Figure 13B:
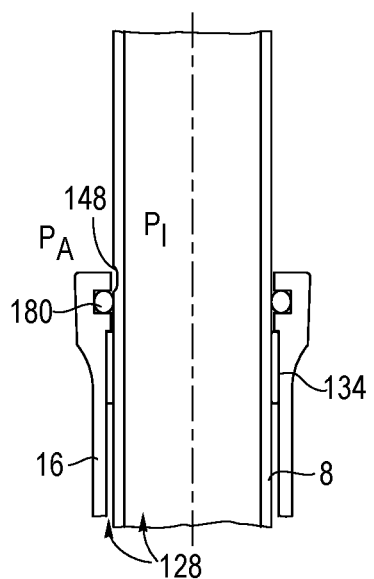
FIG. 13B is a partial cross-sectional view of the suspension system shown in FIG. 12 in an extended position.

Referring to FIGS. 10A-13B, in another embodiment, the entire seal 132, including the upper and lower lips 166, 164 of the embodiment shown in FIGS. 10A-11B or the O-ring seal 180 of FIGS. 12-13B, may be momentarily aligned with the by-pass volume 148 when the first and second tubes are moved to a least one of the compressed, at-rest and extended positions. In this embodiment, the by-pass volume 148 momentarily defines a direct bi-directional flow pathway 446 between the interior chamber 128 and the ambient environment when the seal 132, 180 is momentarily aligned with the at least one by-pass volume 148, meaning the flow pathway does not require a two-step flow transmission in this embodiment.

Figure 14:
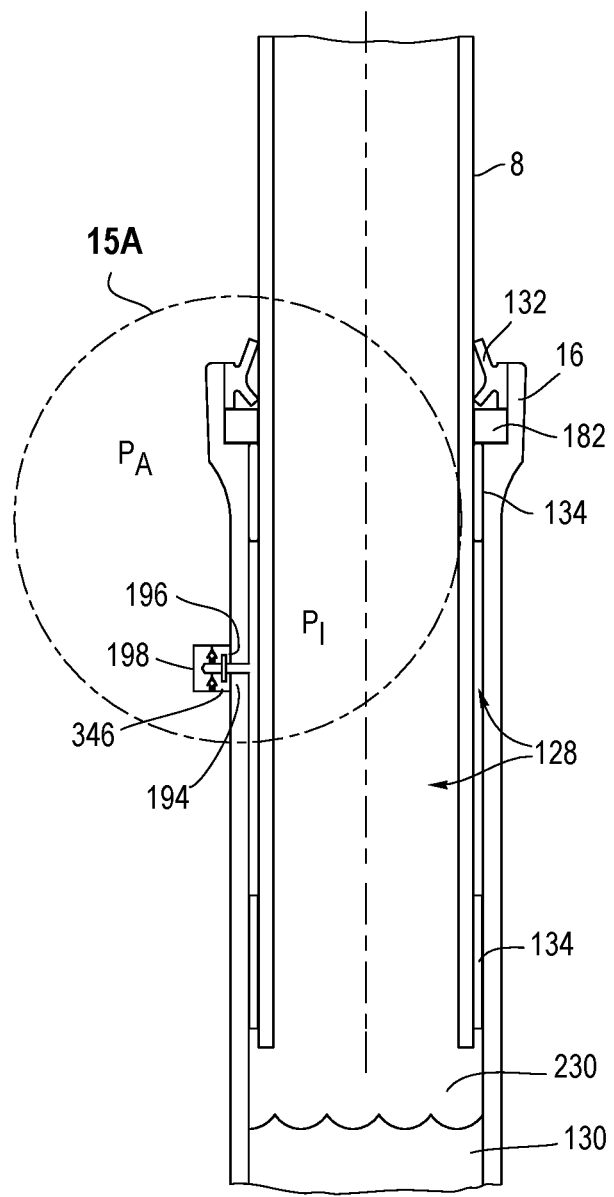
FIG. 14 is a partial cross-sectional view of another embodiment of a suspension system.
Figure 16:
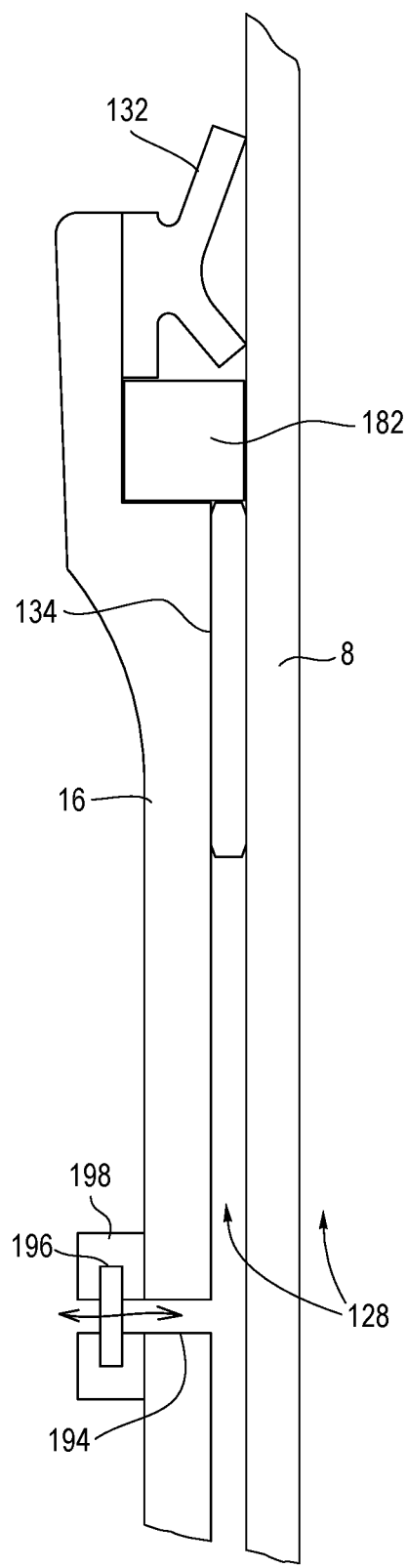
FIG. 16 is an enlarged partial cross-sectional view of another embodiment of a suspension system.

Now referring to FIGS. 14-24, another embodiment of the suspension assembly 60 include a bi-directional flow pathway defined by at least one vent hole 194 formed in the tube 16. It should be understood that in some embodiments, a plurality of circumferentially spaced vent holes 194 are formed in the tube. In one embodiment, shown in FIGS. 14-16, the vent hole 194 is formed through the wall 260 of the tube 8 and is in direct fluid communication with the interior chamber 128. An air permeable filter 196 may be disposed across the vent hole 194 as shown in the embodiments of FIGS. 14, 15A and 16. As shown in FIG. 15B, the filter may be omitted. The filter 196 permits the flow of gas, such as air, through the filter, but absorbs and prevents the transmission of liquids, such as the lubricating fluid 130. The air permeable filter 196 may be a Gore-Tex material or similar membrane that may allow smaller air molecules to pass, but preclude larger oil molecules from passing. In one embodiment, the tube 16 may include a housing 198 extending radially outwardly from the exterior surface 122, with the housing defining in part the vent hole 194. The filter 196 may be disposed in the housing 198 across the vent hole 194.

The vent hole 194 may include an inlet port 200 configured with a one-way intake valve 202 and an outlet port 204 configured with a one-way exhaust valve 206, for example with the inlet and outlet ports formed in the housing, and the inlet and outlet valves disposed in the housing. The inlet and outlet ports 200, 204 are in fluid communication with the ambient environment. The exhaust and intake valves 206, 202 may be configured to open at respective first and second predetermined pressure differentials, for example with the outlet valve set to open at a first predetermined pressure differential equal to or greater than 0 PSI and a second predetermined pressure differential equal to or less than 0 PSI. The "crack" pressures for opening the exhaust and intake valves 206, 202 may be approximately at or between 0.1 psi and 5 psi, and may be about 0.5 psi in one embodiment. The absolute values of the first and second predetermined pressure differentials may be the same or different. In one embodiment, the inlet and outlet ports may be configured as a single passageway, with a two-way valve disposed in the passageway and defining the exhaust and intake valves.

In another embodiment shown in FIG. 16, the inlet and outlet ports are omitted, with the vent hole 194, formed in the tube wall 260 and the housing 198, communicating directly with the ambient environment. A filter 196 may be connected to the housing, and disposed across the vent hole 194. Referring to the embodiment shown FIG. 17, the vent hole 194 is formed in and through the tube wall 260, the bushing 134 and the housing 198. Referring to the embodiment shown in FIG. 18, the vent hole 194, formed through the tube wall 260 and housing 198, is in communication with the interior chamber 128 above the bushing 134 and below the seal 132, for example in communication with the absorbent 182. In the embodiments of FIGS. 14-18, the by-pass volume may be omitted. It should be understood that in any of the embodiments, the filter 196, inlet and outlet ports 200, 204, and/or the intake and exhaust valves 202, 206, may be incorporated or omitted as desired, and may be located below, at, or above the bushing 134. The exhaust and intake valves 206, 202 may be mechanically or electronically controlled based on pressure values, position, or any other measurable system function, and may define the first predetermined pressure differential ($P_{PD1}$) and the second predetermined pressure differential ($P_{PD2}$) respectively.

Figure 22:
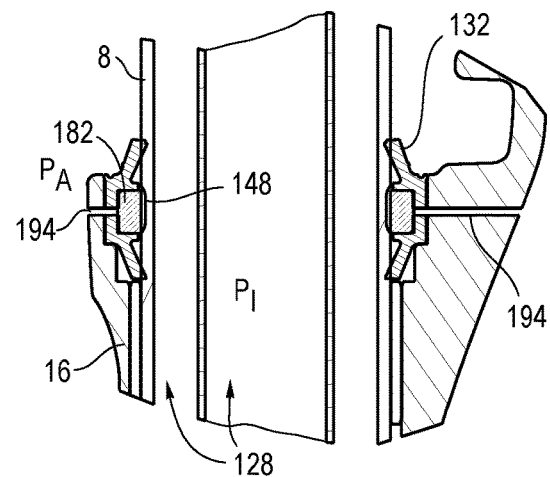
FIG. 22 is a partial cross-sectional view of another embodiment of a suspension system in an at-rest position.

Now referring to FIGS. 19-24, various embodiments incorporate the by-pass volume 148 and a vent hole 194. For example, as shown in FIGS. 19-22, the vent hole 194 is formed in and through the outer tube 16 and seal 132 and is in flow communication with by-pass volume 148 and the seal volume 168. In one embodiment, the vent hole 194 is formed at least in part through the seal 132. The bi-directional flow pathway may be defined by the operation of the by-pass volume as disclosed above, or further between the seal volume 168 and the ambient environment through the vent hole 194. In one embodiment, the by-pass volume 148 is positioned such that the by-pass volume 148 is never aligned with the upper lip 166, meaning the upper lip always maintains a seal with the exterior surface 126 of the tube 8. Referring to FIG. 22, the absorbent 182 is positioned in the seal volume 168 between the upper and lower lips 166, 164, and across from the by-pass volume 148 when the tubes 8, 16 are in the at-rest position. The absorbent 182 absorbs lubricating oil that may be in the by-pass feature or on the tube wall 160. Typically, lubricating fluid 130 (e.g., oil) is disposed within the outer tube 16, defining a lower fork chamber 230 as shown in FIG. 14. The absorbent 182 also acts as a filter in keeping system lubricating oil from entering the vent hole 194 or from outside contamination reaching the interior chamber 128 or bushing 134, or interface with the bushing. With reciprocal telescoping action of the tubes 8, 16, the by-pass volume 148 creates a momentary fluid communication through the vent hole 194 to the ambient environment. There may be more than one vent hole 194 as described above. The momentary fluid communication equalizes differential pressure between the ambient environment and the interior chamber 128.

Figure 23:
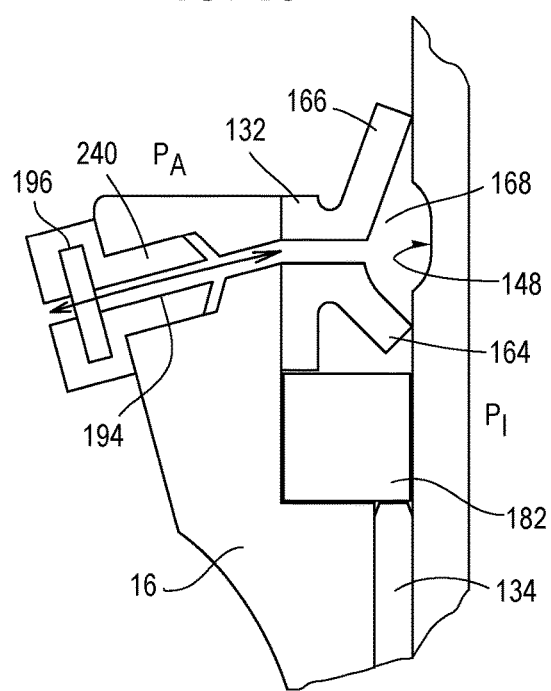
FIG. 23 is an enlarged partial cross-sectional view of another embodiment of a suspension system in an at-rest position.
Figure 24:
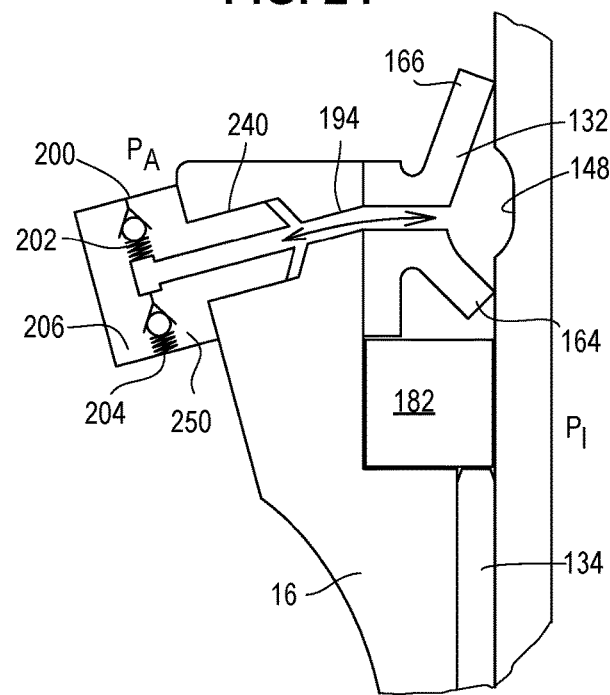
FIG. 24 is an enlarged partial cross-sectional view of another embodiment of a suspension system.

Referring to FIGS. 23 and 24, the tube 16 includes a socket 240. A plug 250 is disposed in the socket 240, and may be secured in the socket by way of press-fit, threads, adhesive or other suitable connections. The plug 250, tube 16 and seal 132 may define in part, and in combination, the vent hole 194. The plug 250 also may be configured with an air permeable filter 196 (FIG. 23), and/or inlet and outlet ports 200, 204 configured with one-way intake and exhaust valves 202, 206.

Operation

Referring to the embodiments of FIGS. 10A-13B, at some point in the relative stroke of the upper (inner) and lower (outer) tubes 8, 16, possibly in the at rest position or for a short duration of a stroke event, the by-pass volume 148 may provide automatic and direct venting to the atmosphere from the interior chamber 128. In the other relative positions of the tubes 8, 16, the seal 132, 180 is biased against the exterior surface 126 and seals the interior chamber 128 from the ambient environment.

Referring to the embodiments of FIGS. 5-9B, during a stroke event, for example during compression or at a compressed position, the by-pass volume 148 feature will fluidly communicate the seal volume 168 with the interior chamber 128, defined in part by the lower fork chamber, equalizing the seal volume 168 pressure with the pressure of the interior chamber 128. At another time in the stroke event, for example during extension or at an extended position, the by-pass volume will fluidly communicate the seal volume 168 with the ambient environment. This process repeats during use and reciprocal movement of the tubes 8, 16 to automatically minimize the differential pressure between the interior chamber 128 and the ambient environment.

Referring to the embodiments of FIGS. 14-18, the interior chamber is continuously vented through the vent hole 194 communicating between the interior chamber 128 and the ambient environment, regardless of the relative positions of the upper (inner) and lower (outer) tubes 8, 16. The flow through the vent hole may be filtered with a filter 196, and may be automatically regulated with intake and exhaust valves 202, 206, though the vent hole 194 is always in fluid communication with the ambient environment.

Referring to the embodiments of FIGS. 19-24, the pressure differential is equalized through a combination of a by-pass volume 148 and vent hole 194. During a stroke event, for example during compression or at a compressed position, the by-pass volume 148 feature will fluidly communicate the seal volume 168 with the interior chamber 128, defined in part by the lower fork chamber, equalizing the seal volume 168 pressure with the pressure of the interior chamber 128. The seal volume 168 then communicates with the ambient environment through the vent hole 194, formed at least in part through the seal 132. This process repeats during use and reciprocal movement of the tubes 8, 16 to automatically minimize the differential pressure between the interior chamber 128 and the ambient environment. At another time in the stroke event, for example during extension or at an extended position, the by-pass volume may, but does not necessarily, fluidly communicate the seal volume 168 with the ambient environment.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A bicycle suspension system comprising:
    a first tube comprising a first interior surface and a first exterior surface, wherein the first exterior surface is exposed to an ambient environment at atmospheric pressure;
    a second tube comprising a second interior surface and a second exterior surface, wherein the second tube is telescopically disposed in the first tube with at least a portion of the first interior surface facing and overlapping at least a portion of the second exterior surface, wherein the first and second tubes are telescopically moveable relative to each other between at least an at-rest position, a compressed position and an extended position, and wherein the first interior surface and the second exterior surface define an interior chamber therebetween having a chamber pressure, wherein the difference between the chamber pressure and the atmospheric pressure defines a pressure differential; and
    a bi-directional flow pathway defined between the interior chamber and the ambient environment when the first and second tubes are in at least one or more of the at-rest position, the compressed position and the extended position, wherein the bi-directional flow pathway automatically provides for (1) a first flow of air from the interior chamber to the ambient environment when the pressure differential is greater than a first predetermined pressure differential, and (2) a second flow of air from the ambient environment to the interior chamber when the pressure differential is less than a second predetermined pressure differential, wherein the bi-directional flow pathway comprises at least one by-pass volume formed on the second exterior surface of the second tube.

2. The bicycle suspension system of claim 1 wherein one or both of the first and second predetermined pressure differentials are zero.

3. The bicycle suspension system of claim 1 wherein the at least one by-pass volume comprises a plurality of by-pass volumes circumferentially spaced around the exterior surface of the second tube.

4. The bicycle suspension system of claim 1 wherein the at least one by-pass volume comprises a circumferential width and an axial length.

5. The bicycle suspension system of claim 4 wherein the circumferential width is greater than axial length.

6. The bicycle suspension system of claim 4 wherein the axial length is greater than circumferential width.

7. The bicycle suspension system of claim 1 wherein the at least one by-pass volume comprises an annular recess extending around an entire perimeter of the second exterior surface.

8. The bicycle suspension system of claim 1 wherein the bi-directional flow pathway comprises a first pathway through the by-pass volume to the ambient environment when the first and second tubes are in one of the compressed or extended positions, and a second pathway from the interior chamber through the by-pass volume when the first and second tubes are in the other of the compressed or extended positions.

9. A bicycle suspension system comprising:
a first tube comprising a first interior surface and a first exterior surface, wherein the first exterior surface is exposed to an ambient environment at atmospheric pressure;
a second tube comprising a second interior surface and a second exterior surface, wherein the second tube is telescopically disposed in the first tube with at least a portion of the first interior surface facing and overlapping at least a portion of the second exterior surface, wherein the first and second tubes are telescopically moveable relative to each other between at least an at-rest position, a compressed position and an extended position, and wherein the first interior surface and the second exterior surface define an interior chamber therebetween having a chamber pressure, wherein the difference between the chamber pressure and the atmospheric pressure defines a pressure differential; and
a bi-directional flow pathway defined between the interior chamber and the ambient environment when the first and second tubes are in at least one or more of the at-rest position, the compressed position and the extended position, wherein the bi-directional flow pathway automatically provides for (1) a first flow of air from the interior chamber to the ambient environment when the pressure differential is greater than a first predetermined pressure differential, and (2) a second flow of air from the ambient environment to the interior chamber when the pressure differential is less than a second predetermined pressure differential, wherein the first tube comprises a seal engaging the second exterior surface of the second tube and the seal comprises spaced apart first and second lips, wherein the first lip is momentarily aligned with a by-pass volume as the first and second tubes are moved between the at-rest position to one of the compressed and extended positions.

10. The bicycle suspension system of claim 1 wherein the bi-directional flow pathway comprises at least one vent hole formed in the first tube and in flow communication with the at least one by-pass volume.

11. The bicycle suspension system of claim 10 further comprising an air-permeable filter disposed across the at least one vent hole.

12. The bicycle suspension system of claim 11 wherein the at least one vent hole comprises an inlet port comprising an intake valve and an outlet port comprising an exhaust valve, wherein the inlet and outlet ports are in fluid communication with the ambient environment.

13. The bicycle suspension system of claim 10 wherein the first tube comprises a seal engaging the second exterior surface of the second tube, wherein the at least one vent hole is formed at least in part through the seal.

14. The bicycle suspension system of claim 10 wherein the first tube comprises at least one socket and further comprising at least one plug disposed in the at least one socket, wherein the at least one plug defines in part the at least one vent hole.

15. The bicycle suspension system of claim 9 wherein the seal is momentarily aligned with the at least one by-pass volume when the first and second tubes are moved to a least one of the compressed, at-rest and extended positions, wherein the at least one by-pass volume momentarily defines the bi-directional flow pathway between the interior chamber and the ambient environment when the seal is momentarily aligned with the at least one by-pass volume.

16. The bicycle suspension system of claim 9 wherein the second lip is momentarily aligned with the by-pass volume as the first and second tubes are moved between the at-rest position to the other of the compressed and extended positions.

17. A bicycle suspension system comprising:
a first tube comprising a first interior surface and a first exterior surface, wherein the first exterior surface is exposed to an ambient environment at atmospheric pressure;
a second tube comprising a second interior surface and a second exterior surface, wherein the second tube is telescopically disposed in the first tube with at least a portion of the first interior surface facing and overlapping at least a portion of the second exterior surface, wherein the first and second tubes are telescopically moveable relative to each other between at least an at-rest position, a compressed position and an extended position, and wherein the first interior surface and the second exterior surface define an interior chamber therebetween having a chamber pressure, wherein the difference between the chamber pressure and the atmospheric pressure defines a pressure differential;
a bi-directional flow pathway defined between the interior chamber and the ambient environment when the first and second tubes are in at least one or more of the at-rest position, the compressed position and the extended position, wherein the bi-directional flow pathway automatically provides for (1) a first flow of air from the interior chamber to the ambient environment when the pressure differential is greater than a first predetermined pressure differential, and (2) a second flow of air from the ambient environment to the interior chamber when the pressure differential is less than a second predetermined pressure differential; and a bushing disposed between the first interior surface of the first tube and the second exterior surface of the second tube, wherein the bushing comprises a bushing flow pathway defining in part the bi-directional flow pathway.

18. The bicycle suspension system of claim 17 further comprising an air permeable absorbent disposed between the first interior surface of the first tube and the second exterior surface of the second tube and between the bushing and a proximal end of the first tube.

19. The bicycle suspension system of claim 17 wherein the bi-directional flow pathway comprises at least one vent hole formed in the first tube.

20. The bicycle suspension system of claim 19 wherein the at least one vent hole is in direct fluid communication with the interior chamber.

21. The bicycle suspension system of claim 19 wherein the bushing is coupled to and moves with the first tube, and wherein the at least one vent hole is formed in the first tube and the bushing.

22. The bicycle suspension system of claim 19 further comprising an air-permeable filter disposed across the at least one vent hole.

23. The bicycle suspension system of claim 19 wherein the at least one vent hole comprises an inlet port comprising an intake valve and an outlet port comprising an exhaust valve, wherein the inlet and outlet ports are in fluid communication with the ambient environment.

24. The bicycle suspension system of claim 19 wherein the at least one vent hole comprises a plurality of vent holes circumferential spaced around the first tube.

* * * * *